US009171455B1

(12) United States Patent
Mart et al.

(10) Patent No.: US 9,171,455 B1
(45) Date of Patent: Oct. 27, 2015

(54) MULTI-MODAL WIRELESS CONTROLLER FOR CONTROLLING AN LED LIGHTING SYSTEM

(71) Applicants: Gary K. Mart, Bonita Springs, FL (US); Jose Fernandez, Sunrise, FL (US)

(72) Inventors: Gary K. Mart, Bonita Springs, FL (US); Jose Fernandez, Sunrise, FL (US)

( * ) Notice: Subject to any disclaimer, the term of this patent is extended or adjusted under 35 U.S.C. 154(b) by 459 days.

(21) Appl. No.: 13/729,913

(22) Filed: Dec. 28, 2012

Related U.S. Application Data

(60) Provisional application No. 61/582,101, filed on Dec. 30, 2011.

(51) Int. Cl.

| | |
|---|---|
| ***G05B 23/02*** | (2006.01) |
| ***H02J 13/00*** | (2006.01) |
| ***G05B 11/01*** | (2006.01) |
| ***G08B 5/22*** | (2006.01) |
| ***B60Q 1/124*** | (2006.01) |
| ***F21V 23/04*** | (2006.01) |
| ***F21V 33/00*** | (2006.01) |
| ***H05B 37/00*** | (2006.01) |
| ***G08C 17/02*** | (2006.01) |

(52) U.S. Cl.
CPC .................................... *G08C 17/02* (2013.01)

(58) Field of Classification Search
CPC ........... H02J 13/00; H04Q 9/14; H04L 12/28; H04L 29/12254; G08C 19/28; G09F 9/33; B60Q 1/068; F21V 17/02; F21V 33/0052; H04W 28/04; H05B 37/0254
USPC ......... 340/3.52, 9.1, 9.11, 9.16, 12.23, 12.29, 340/815.45; 362/233, 276, 85; 370/329; 315/318
See application file for complete search history.

(56) References Cited

U.S. PATENT DOCUMENTS

| | | | | |
|---|---|---|---|---|
| 8,264,341 | B2 * | 9/2012 | Jung et al. | 340/531 |
| 8,300,577 | B2 * | 10/2012 | Simons et al. | 370/328 |
| 8,436,556 | B2 * | 5/2013 | Eisele et al. | 315/307 |
| 2008/0048585 | A1 * | 2/2008 | Denville | 315/294 |
| 2008/0143493 | A1 * | 6/2008 | Nam et al. | 340/310.11 |
| 2009/0072944 | A1 * | 3/2009 | Hayward | 340/2.1 |
| 2011/0053492 | A1 * | 3/2011 | Hochstein | 455/7 |
| 2011/0095867 | A1 * | 4/2011 | Ahmad | 340/10.1 |
| 2011/0134239 | A1 * | 6/2011 | Vadai et al. | 348/143 |
| 2012/0059622 | A1 * | 3/2012 | Cacace et al. | 702/150 |
| 2012/0062123 | A1 * | 3/2012 | Jarrell et al. | 315/131 |
| 2012/0072138 | A1 * | 3/2012 | Walters et al. | 702/58 |
| 2012/0262917 | A1 * | 10/2012 | Courcelle | 362/235 |
| 2014/0111098 | A1 * | 4/2014 | Amarin et al. | 315/152 |

* cited by examiner

*Primary Examiner* — Kerri McNally
*Assistant Examiner* — Munear Akki
(74) *Attorney, Agent, or Firm* — Patents on Demand P.A.; Brian K. Buchheit; Scott M. Garrett

(57) ABSTRACT

A multi-modal wireless controller can include a processor, memory storage, a radio frequency (RF) engine, outputs, power inputs, switches, a mode input, and a RF input. The memory storage can have machine-readable instructions that define the functionalities of a multi-modal wireless controller. The RF engine can be configured to transmit and receive wireless RF signals. The outputs can provide electrical power and a direct current (DC) voltage control signal. The power input can be configured to receive electrical power from a power source. The switches can be configured to switch the electrical power between one of the power input and outputs on or off, responsive to the processor. The mode input can include a switch element that designates an operating mode. The RF input can be coupled to the RF engine and can include a switch element that designates an operating frequency of the RF engine and/or a zone.

19 Claims, 8 Drawing Sheets

200

MULTI-MODAL WIRELESS CONTROLLER FOR CONTROLLING AN LED LIGHTING SYSTEM

CROSS-REFERENCE TO RELATED APPLICATION

This application claims the benefit of Provisional Application Ser. No. 61/582,101 entitled "CONTROL AND LIGHTING SYSTEM", filed Dec. 30, 2011, and U.S. patent application Ser. No. 12/996,221 entitled "LED LIGHT BULB", both of which are herein incorporated by reference in their entirety.

BACKGROUND

The present invention relates to the field of lighting and, more particularly, to an improved means for controlling a light-emitting diode (LED) lighting system.

LED lights have become an energy-efficient alternative to conventional incandescent and fluorescent lights. The focused light provided by LED lights have made them popular in areas, particularly outdoors, where decreased light pollution is desired. The LED lights are often retrofitted to an existing lighting system, and bound to the existing lighting control programs of that system.

The electronic nature of LED lights, over conventional wired systems, allow for greater versatility in control options. A variety of wireless controllers have been developed to utilize wireless communications to control operation of LED lights in a lighting system. However, conventional wireless controllers are each designed for use with a specific element of the lighting system (e.g., a light source controller, a motion sensor controller, etc.). This limits the flexibility of the wireless controller for reconfiguration purposes.

Further, conventional wireless controllers are better-suited for indoor LED lighting systems, not for handling an existing layout of widely-spaced lights. That is, a conventional wireless controller generally has multiple outputs to control multiple LED lights in a relatively confined area like a large room. Such a configuration does not lend itself well to controlling LED streetlights for a city block or parking lot.

BRIEF SUMMARY

One aspect of the present invention can include a multi-modal wireless controller that includes a processor, memory storage, a radio frequency (RF) engine, outputs, power inputs, switches, a mode input, and a RF input. The memory storage can be coupled to the processor and can have machine-readable instructions that define the functionalities of a multi-modal wireless controller. The RF engine can be coupled and responsive to the processor and can be configured to transmit and receive wireless RF signals. The outputs can provide electrical power and a direct current (DC) voltage control signal. The power input can be configured to receive the electrical power from a power source. The switches can be configured to switch on or off the electrical power between one of the power input and outputs, responsive to the processor. The mode input can be coupled to the processor and can include a switch element whose position corresponds to an operating mode of the multi-modal wireless controller. The RF input can be coupled to the RF engine and can include a switch element whose position corresponds to an operating frequency of the RF engine and/or an identifier of a zone where the multi-modal wireless controller is located.

Another aspect of the present invention can include a method for installing a lighting system. Such a method can begin with the installation of lighting units. Each lighting unit can include a multi-modal wireless controller and one or two lighting fixtures to be controlled by the multi-modal wireless controller. Each multi-modal wireless controller can be configured to operate as a light source controller from among several configuration options. Each configuration option can be represented by a unique configuration ID. Groups of multi-modal wireless controllers can be configured to operate on one selectable wireless channel; different groups can operate on different wireless channels. Each selectable wireless channel can be represented by a unique control ID.

Yet another aspect of the present invention can include a wirelessly-controlled lighting system. Such a system can include lighting fixtures, auxiliary data sensors, and multi-modal wireless controllers. The auxiliary data sensors can be configured to capture data that is meant to influence operation of the lighting fixtures. The multi-modal wireless controllers can be configured to control the operation of the lighting fixtures based upon the captured data of the auxiliary data sensors. Each multi-modal wireless controller can be coupled to an auxiliary data sensor or at most two lighting fixtures. A configuration ID can be designated for a multi-modal wireless controller to match the type of its coupled component. Further, the multi-modal wireless controller can be able to be coupled with a different component by changing its configuration ID. Subgroups of multi-modal wireless controllers required to communicate with each other can be configured to utilize a specified wireless channel designated by a control ID.

DETAILED DESCRIPTION

Figure 1:
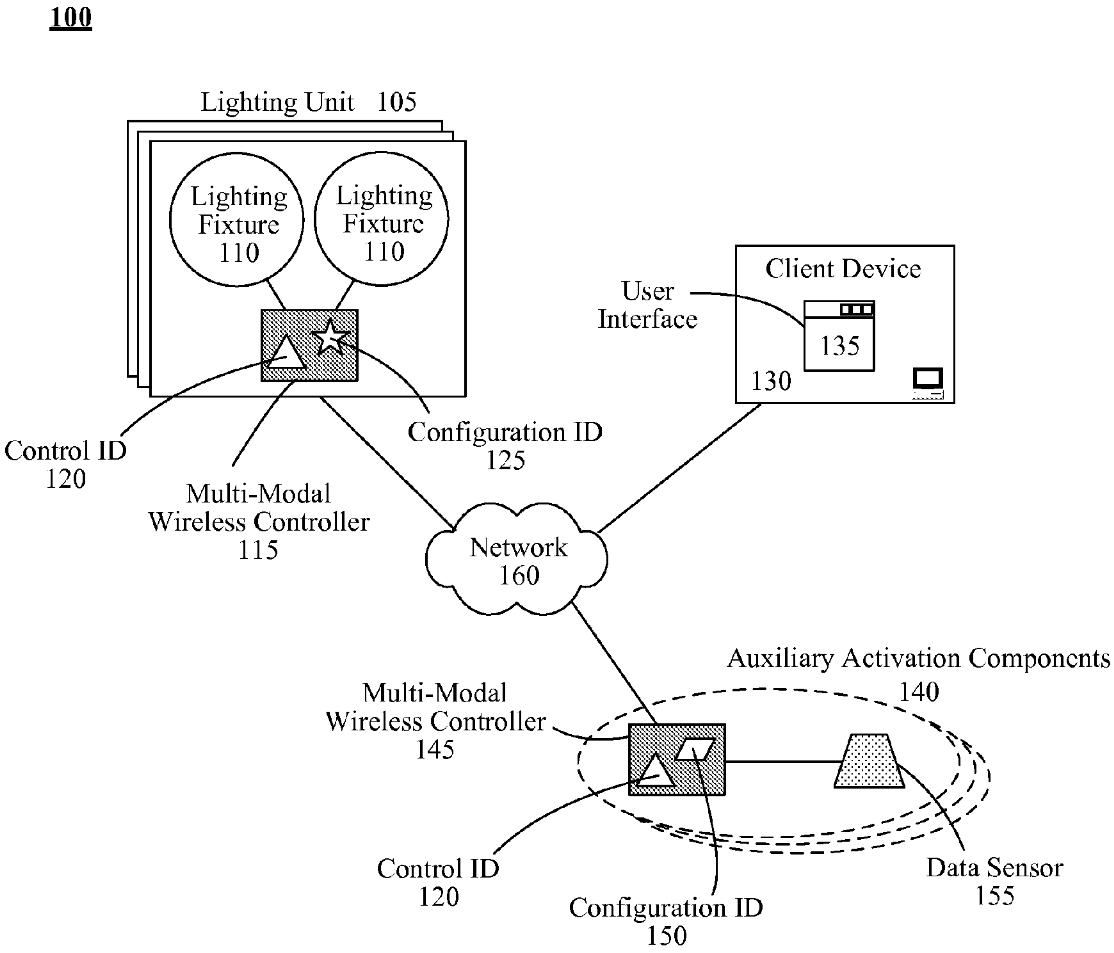
FIG. 1 is a schematic diagram of a lighting system that utilizes multi-modal wireless controllers to control operation of multiple lighting fixtures in accordance with embodiments of the inventive arrangements disclosed herein.

The present invention discloses a means for wirelessly controlling an LED lighting system. Multiple multi-modal wireless controllers can be configured to connect to either a lighting fixture or a data sensor of a lighting system. The multi-modal wireless controllers that need to send/receive signals from each other (i.e., a sensor that triggers a light to turn on) can be configured with the same zone or control ID. The multi-modal wireless controllers can be reconfigured and/or relocated within the lighting system without having to rewire the light fixtures or move the data sensors.

As will be appreciated by one skilled in the art, aspects of the present invention may be embodied as a system, method and/or computer program product. Accordingly, aspects of the present invention may take the form of an entirely hardware embodiment or an embodiment combining software (including firmware, resident software, micro-code, etc.) and hardware aspects that may all generally be referred to herein as a "circuit," "module" or "system". Aspects of the present invention are described below with reference to flowchart illustrations and/or block diagrams of methods and/or apparatus (systems) according to embodiments of the invention.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 is a schematic diagram of a lighting system 100 that utilizes multi-modal wireless controllers 115 and 145 to control operation of multiple lighting fixtures 110 in accordance with embodiments of the inventive arrangements disclosed herein. The multi-modal wireless controllers 115 described herein can be used in conjunction with various types of lighting units 105 and/or lighting fixtures 110; light-emitting diode (LED) lights can benefit the most from the use of the multi-modal wireless controllers 115, and, as such, are depicted in the Figures.

Lighting system 100 can include multiple lighting units 105 that are geographically dispersed in a location (i.e., not grouped within close proximity to each other). For example, lighting system 100 can be used to illuminate walking trails, a parking lot, or a warehouse. Each lighting unit 105 can include multiple lighting fixtures 110 with up to two lighting fixtures 110 connected to a single multi-modal wireless controller 115.

That is, a lighting unit 105 can have four lighting fixtures 110 configured as two sets of two lighting fixtures 110 with each set controlled by a separate multi-modal wireless controller 115; alternatively, each lighting fixture 110 can be controlled by a separate multi-modal wireless controller 115.

This flexibility can be particularly beneficial for lighting units 105 that include different types of lighting fixtures 110 (e.g., directional lights, spot lights, etc.) that should be activated in different situations.

The lighting fixtures 110 can be designed for high-power applications, indoor and/or outdoor, where luminance is desired at distances of 100 ft. like the LED light fixtures 110 described in U.S. patent application <<DESIGNATORS FOR GTL12001US1 ASSIGNED BY USPTO AT TIME OF FILING, TO BE FILED AFTER THE GTL120001US1 is filed and before this case is filed>>

The multi-modal wireless controllers 115 and 145 can be a configurable electronic component for the purposes of communicating with each other over a network 160 to control operation of the lighting units 105. Each multi-modal wireless controller 115 and 145 can be configured to interface with up to two lighting fixtures 110 or a specific type of data sensor 155.

A multi-modal wireless controller 115 connected to one or more lighting fixtures 110, herein referred to as a light source controller 115, can control when the lighting fixtures 110 are activated as well as other operational parameters (e.g., luminance level, timing, etc.). Configuring a multi-modal wireless controller 115 to operate as a light source controller 115 can assign a unique configuration ID 125 that indicates that the operational mode of the multi-modal wireless controller 115 is to control lighting fixtures 110.

The multi-modal wireless controller 115 can further include a universal asynchronous receiver/transmitter (UART) port that, when connected to the lighting fixture 110, can receive a variety of lighting data, such as wattage, voltage, current per string, and temperature, that the multi-modal wireless controller 115 can send to designated data consumers for additional processing or storage.

Activation of lighting fixtures 110 by a light source controller 115 can be based upon input from one or more sets of auxiliary activation components 140. Auxiliary activation components 140 can include a multi-modal wireless controller 145 configured to interface with a specific type of data sensor 155, herein referred to as a sensor controller 145, and the connected data sensor 155. The sensor controller 145 can have a different configuration ID 150 for each type of supported data sensor 155. The sensor controller 145 can be connected to the data sensor 155 in a variety of manners, such as a wireless network connection or an inter-integrated circuit (12C) serial port.

It should be emphasized that a single multi-modal wireless controller 115 and 145 can be configured in one manner (i.e., a light source controller 115 or data sensor 155) and then reconfigured at a later time to act in a different manner (i.e., a light source controller 115 or a different type of data sensor 155). This can add a level of reusability and versatility that is lacking in conventional, specialized wireless controllers.

A data sensor 155 can be an electronic element configured to capture data about specific environmental variable. Examples of a data sensor 155 can include, but are not limited to, a motion sensor, a photo sensor, a dimmer sensor, a heat sensor, a digital camera, and the like. The data captured by the data sensor 155 can be sent to the connected sensor controller 145 that then forwards the captured data to the appropriate light source controllers 115.

The sensor controller 145 can include two built-in configurations (source and sink) for dimmer data sensors 155 that allows for easy integration of a variety of commercial dimmer data sensor 155 components. Another benefit of having the dimming circuitry built-in can be the elimination of the need for a separate dimming driver for the lighting system. Implementing dimming in a conventional wireless lighting system can require not only the LED driver, but also a dimming driver. A multi-modal wireless controller 145 configured to act as a sensor controller 145 for a dimmer data sensor 155 can only require the standard LED driver, thus, removing a level of complexity from the lighting system.

The sensor controller 145 can be capable of interfacing with data sensors 155 that provide varying granularities of data. For example, a simple or "dumb" data sensor 155 can provide a binary signal (e.g., high or low) that only indicates if it is on or off. A more robust or "smart" data sensor 155 can provide more detailed information about the operation of the data sensor 155 like delay time or voltage level.

The type of data sensor 155 that the sensor controller 145 connects to can be reflected in its configuration ID 125. The capability of differentiating between these types of data sensors 155 via the configuration ID 125 can provide a significant advantage over conventional lighting systems. In a conventional lighting system, data sensor 155 requirements can be stored in a centralized area that a wireless controller accesses and can require configuration of the data sensor 155 and/or wireless controller to be performed by a lighting or system engineer. Using the present invention, configuration of the multi-modal wireless controller 115 to handle a "smart" or "dumb" data sensor 155 can be performed by any qualified person (e.g., electrician, maintenance personnel, etc.) without requiring interaction with any other components of the lighting system.

Communication between sensor controllers 145 and light source controllers 115 can be based upon the control ID 120 assigned to the multi-modal wireless controllers 115 and 145. The multi-modal wireless controllers 115 and 145 can include a testing mode to verify communication between the correct multi-modal wireless controllers 115 and 145.

The control ID 120 can define the zone and system ID to which each multi-modal wireless controller 115 and 145 belongs. The zone can indicate the specific radio frequency (RF) communication channel to be used by multi-modal wireless controllers 115 and 145 for communication. The system ID can be an identifier used to indicate a sub-grouping of multi-modal wireless controllers 115 and 145.

The data encoded within the configuration ID 125 can allow for multiple groups of lighting units 105 to operate for different purposes in the same area using the same RF channel. This can be a key benefit over conventional wireless controllers and lighting systems that typically require different groups of lighting units 105 to operate on separate RF channels. When updating a legacy lighting system to a conventional wireless LED controllers, the existing system layout can have areas that would make allocating different RF channels problematic and/or provide the desired lighting functions. The current invention can eliminate such problems when updating existing lighting systems as well as offer additional flexibility to new lighting systems over conventional wireless controller systems.

Configuration of the multi-modal wireless controllers 115 and 145 (i.e., designating the configuration ID 125 and 150 and/or control ID 120) can be performed physically with input elements (e.g., switches, buttons, a keypad, etc.) incorporated into the multi-modal wireless controller 115 and 145 and/or remotely using a client device 130 over the network 160. Client device 130 can be an electronic device capable of running a user interface 135 and communicating with the multi-modal wireless controllers 115 and 145 over the network 160.

For example, client device 130 can be a handheld electronic device designed to send inputted data to the multi-modal wireless controllers 115 and 145 when a technician brings the device 130 within range of the multi-modal wireless controllers 115 and 145. As another example, the client device 130 can be a desktop computer that conveys data changes to the multi-modal wireless controllers 115 and 145 using the Internet.

The network 160 can utilize a variety of standard wireless communication protocols including the radio frequency (RF) standards that are commonly used in lighting systems. Network 160 can also include any hardware/software/and firmware necessary to convey data encoded within carrier waves. Data can be contained within analog or digital signals and conveyed though data or voice channels. Network 160 can include local components and data pathways necessary for communications to be exchanged among computing device components and between integrated device components and peripheral devices. Network 160 can also include network equipment, such as routers, data lines, hubs, and intermediary servers which together form a data network, such as the Internet. Network 160 can also include circuit-based communication components and mobile communication components, such as telephony switches, modems, cellular communication towers, and the like. Network 160 can include line based and/or wireless communication pathways.

Figure 2:
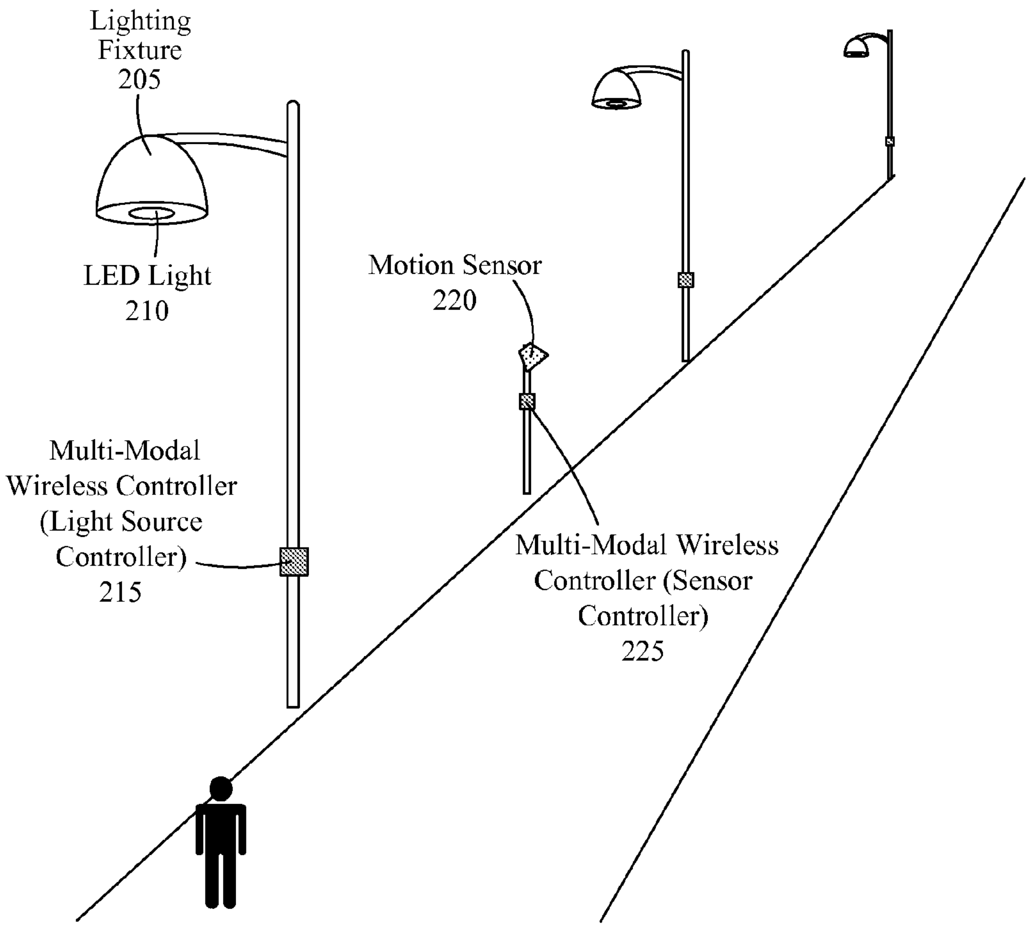
FIG. 2 is an illustration of an example lighting system for using multi-modal wireless controllers in accordance with an embodiment of the inventive arrangements disclosed herein.

FIG. 2 is an illustration of an example lighting system 200 for using multi-modal wireless controllers 215 and 225 in accordance with embodiments of the inventive arrangements disclosed herein. Lighting system 200 can represent an example embodiment of lighting system 100 of FIG. 1.

As shown in this example, the lighting system 200 can illuminate an outdoor area like a park. Lighting fixtures 205 can be mounted so as to provide light in desired areas, such as along a pathway. The lighting fixtures 205 can be mounted in a variety of ways that provide the lighting element, an LED light 210 in this example, with power and positioning to the desired area. The lighting fixtures 205 can be existing elements of the lighting system 200 or can be replacement or retrofitted elements (i.e., LED lights 210 retrofitted into existing receptacles of an incandescent lighting system).

Each lighting fixture 205 can have one or more modal wireless controllers 215 configured as light source controllers, depending upon the quantity and/or type of LED lights 210 contained within the lighting fixture 205. The light source controller 215 can be positioned within a predetermined range of its corresponding lighting fixture 205.

As shown in this example, the light source controller 215 can be positioned upon the same pole as the lighting fixture 205, but at a more accessible height than conventional lighting systems or lighting systems that do not utilize wireless controllers. This can allow for a technician or maintenance personnel to access the light source controller 215 to make configuration changes more easily; more traditional lighting systems can require maintenance personnel to use specialty equipment (e.g., "cherry pickers", mechanical lifts, etc.) to access the wireless controller, which is typically positioned within or much closer to the lighting fixture 205. In this lighting system 200, the light source controller 215 can be positioned at a height above a typical person's reach, but within reach of a technician using a standard ladder.

This same principle can be applied to multi-modal wireless controllers 225 configured as sensor controllers. In this example, a motion sensor 220 can be positioned to activate designated lighting fixtures 205 when motion is detected. The motion data captured by the motion sensor 220 can be passed to its connected sensor controller 225, which then transmits the activation trigger to the designated light source controllers 215 that then activate their connected LED lights 210.

It is important to also highlight the installation efficiency of the multi-modal wireless controllers 215 and 225 over conventional wireless controllers in this example lighting system 200. Installation of a conventional wireless lighting system can be a two-step process; an electrician can first install the lighting units 105 and sensors 220, then a lighting or system engineer can program the installed equipment for the desired lighting parameters and/or programs.

Installation of a lighting system 200 that utilizes the multi-modal wireless controllers 215 and 225 can require only a single step. Since configuration of the multi-modal wireless controller 215 and 225 is as simple as using a set of switches, the electrician or other qualified installation personnel can configure each multi-modal wireless controllers 215 and 225 during installation. This can save time and money for the overall lighting system.

Further, installation of the lighting system 200 using the multi-modal wireless controllers 215 and 225 can be performed without the need for a detailed mapping of the lighting units 105 and/or sensors 220. Conventional wireless lighting system installation often cannot be done upon such a mapping. Thus, the present invention can allow for faster deployment.

Figure 3:
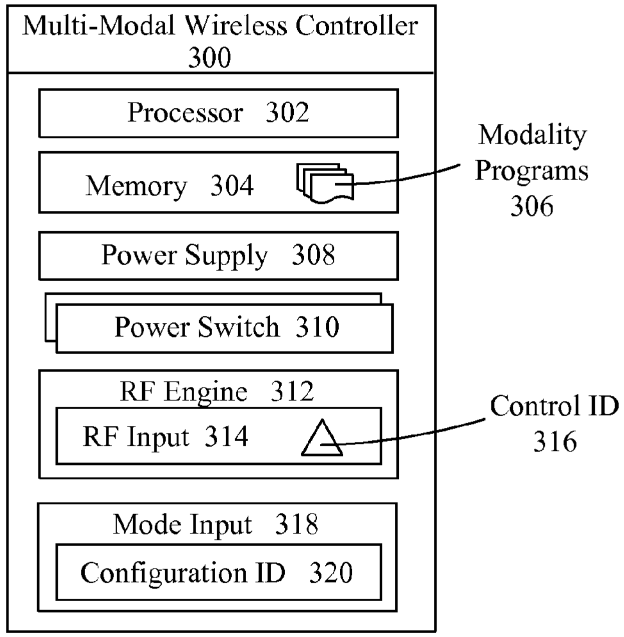
FIG. 3 is a block diagram of a multi-modal wireless controller in accordance with an embodiment of the inventive arrangements disclosed herein.

FIG. 3 is a block diagram of a multi-modal wireless controller 300 in accordance with embodiments of the inventive arrangements disclosed herein. Multi-modal wireless controller 300 can be used within the context of lighting systems 100 and/or 200.

The multi-modal wireless controller 300 can be an electronic device having a processor 302, memory 304, a power supply 308, two power switches 310, a radio frequency (RF) engine 213, and a mode input 318. Multi-modal wireless controller 300 can also include other electronic components to augment and/or enhance operation of these components, such as amplifiers and converters.

The processor 302 can be the component capable of controlling operation of the multi-modal wireless controller 300 and executing the machine-readable instructions of the modality programs 306 stored in memory 304. Memory 304 can represent volatile and non-volatile storage space for operating variables, configuration parameters, the modality programs 306, and the like. The modality programs 306 can represent the actions to be performed by the multi-modal wireless controller 300 for a configured mode input 318.

The mode input 318 can represent an input that specifies how the multi-modal wireless controller 300 is to function. The mode input 318 can include physical switches that can be manipulated by a user as well as components for remote, electronic configuration. The mode input 318 can specify a configuration ID 320 that indicates which modality program 306 the multi-modal wireless controller 300 is to use.

Figure 3A:
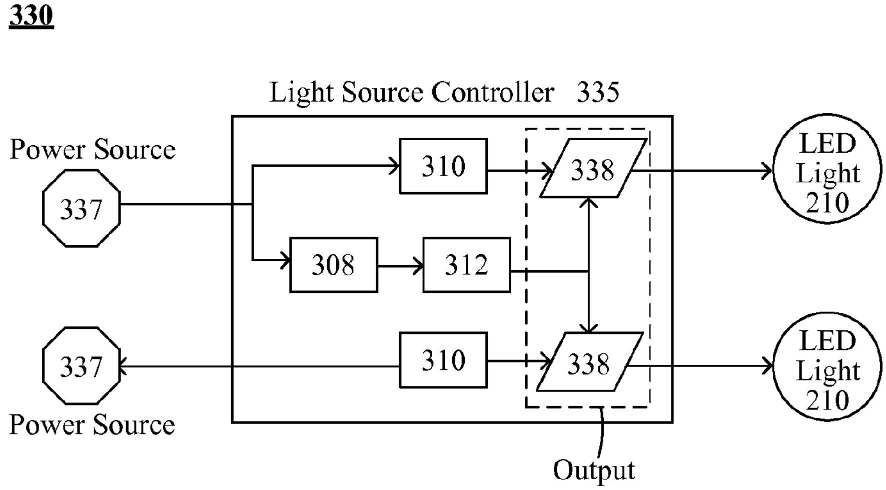
FIG. 3A is a schematic diagram of a multi-modal wireless controller configured as a light source controller in accordance with an embodiment of the inventive arrangements disclosed herein.
Figure 3B:
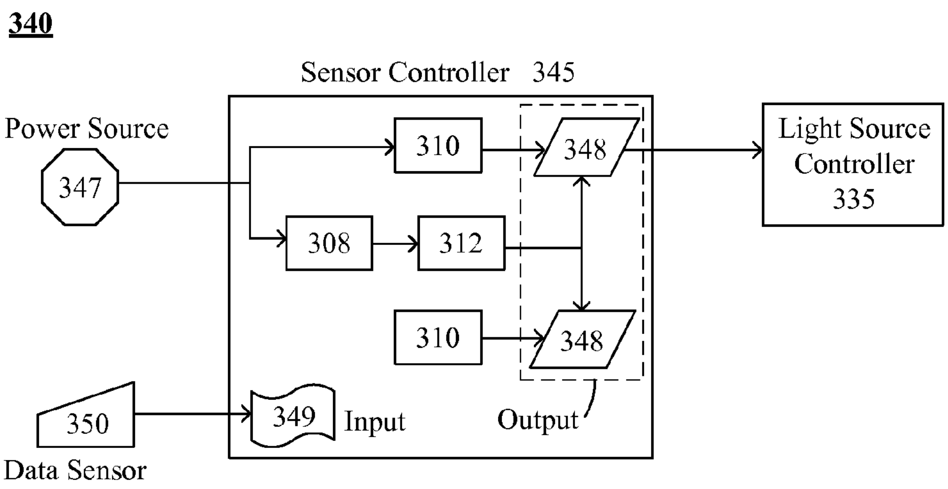
FIG. 3B is a schematic diagram of a multi-modal wireless controller configured as a sensor controller in accordance with an embodiment of the inventive arrangements disclosed herein.

For example, the mode input 318 can be a simple binary switch where one position indicates that the multi-modal wireless controller 300 is to act as a light source controller 335, as shown in FIG. 3A, and the other position indicates operation as a sensor controller 345, as shown in FIG. 3B. Each position can correspond to a different configuration ID 320 that points to a specific modality program 306.

The power supply 308 can be the means by which the multi-modal wireless controller 300 provides power for its connected components. The power switches 310 can represent the means by which the multi-modal wireless controller 300 can control output signals for activating lights or conveying sensor data.

The RF engine 312 can be a component that can send and receive data using RF signals. The RF engine 312 can also include an RF input 314, which, like the mode input 318, can represent an input mechanism for specifying a specific channel or frequency to be used by the multi-modal wireless controller 300. Each RF input 314 can have a corresponding electronic representation or control ID 316. Multi-modal wireless controllers 300 having the same control ID 316 can send/receive RF signals from each other.

For example, referring back to the lighting system 200 of FIG. 2, the sensor controller 225 connected to the motion sensor 220 would notify light source controllers 215 having the same control ID 316 when the motion sensor detected movement. It should be noted that the light source controllers 215 to which the sensor controller 225 communicates need not be in close physical proximity, but merely within the transmission range of the RF engine 312. Therefore, by using the multi-modal wireless controllers 300, the lighting fixtures 205 can be reconfigured to respond to different data sensors 220 without needing to relocate or rewire elements; only changing the control ID 316 of the light source controller 215 to match that of the desired sensor controller 225.

Use of a multi-modal wireless controller 300 as a light source controller 335 can be illustrated by system 330 of FIG. 3A. The light source controller 335 can reside between a power source 337 and its corresponding LED light 210; thus, the light source controller 335 can control when the LED light 210 receives power (e.g., is on or off). Each power source 337 can be connected to a power switch 310, with one power source 337 also feeding the power supply 308. In a situation where the light source controller 335 is connected to only one LED light 210, that power source 337 can be configured to feed the power supply 308.

The power supply 308 can power the RF engine 312, as well as other necessary components of the light source controller 335. Each power switch 310 and the RF engine 312 can be connected to an output 338, that, when activated, powers the corresponding LED light 210. Activation of the outputs 338 can be determined by the processor 302 based upon the modality program 306 being used as well as inputs (not shown) received from any sensor controllers 345.

System 340 of FIG. 3B can illustrate use of a multi-modal wireless controller 300 as a sensor controller 345. Similar to the light source controller 335, the sensor controller 345 can be connected to a power source 347 that connects to the power supply 308 and a power switch 310; the second power switch 310 can be unconnected. This power source 347 configuration can be similar to that of a light source controller 335 connected to only one LED light 210.

The power supply 308 can power the RF engine 312 that connects to the outputs 348 along with the corresponding power switches 310. The output 348 of the power switch 310 that is connected to the power source 347 can be configured via the control ID 316 to transmit to a light source controller 335. Activation of the power switch 310 and output 348 can be controlled by an input 349 signal received from a data sensor 350. It can be assumed that the data sensor 350 includes required elements (e.g., power source, connection ports, etc.) to operate and interface with the sensor controller 345.

Figure 4:
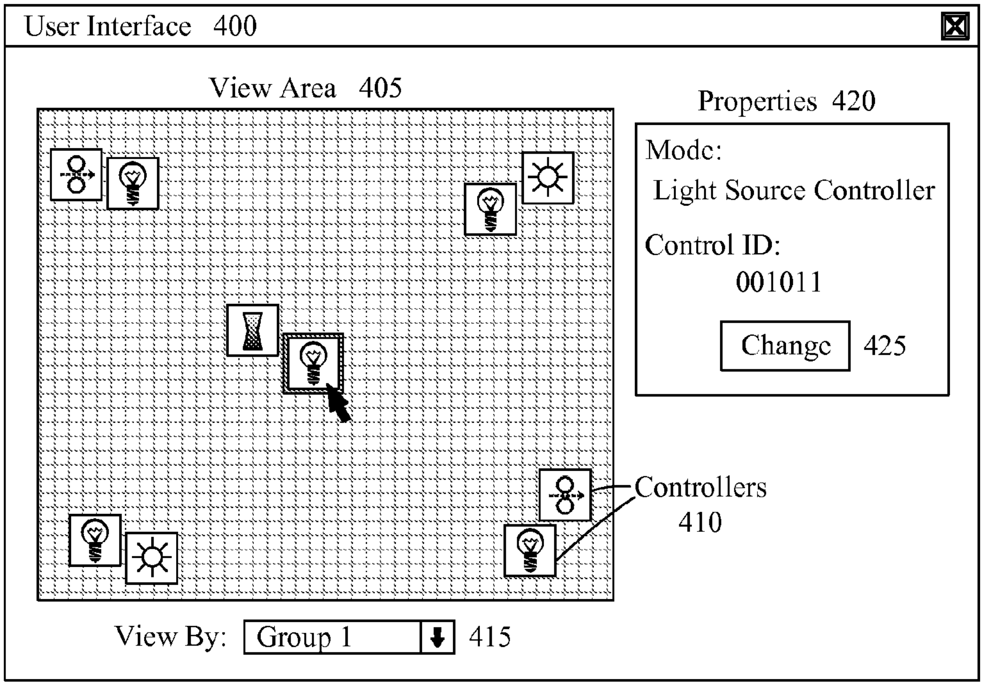
FIG. 4 is an example user interface for remote monitoring and configuration of multi-modal wireless controllers in accordance with an embodiment of the inventive arrangements disclosed herein.

FIG. 4 is an example user interface 400 for remote monitoring and configuration of multi-modal wireless controllers in accordance with embodiments of the inventive arrangements disclosed herein. User interface 400 can be used within the context of lighting systems 100 and/or 200 and/or in conjunction with multi-modal wireless controller 300.

User interface 400 can be written in accordance with standard software design practices using an appropriate software programming language for the target client device 130. User interface 400 can be graphical in nature, as shown in this example, or text-based, depending upon the specific implementation and target client device 130.

In this example, the user interface 400 can provide a user with a graphical means to view 405 active multi-modal wireless controllers 410 and their associated properties 420. In the view area 405, multi-modal wireless controller 410 can be graphically presented in a format selected by the user from a drop-down menu 415. In this example, the multi-modal wireless controllers 410 belonging to “Group 1” can be shown in the view area 405. The identifier, “Group 1”, can be associated with a specific control ID; thus, all the multi-modal wireless controllers 410 having the control ID associated with “Group 1” can be currently displayed in the view area 405.

The multi-modal wireless controllers 410 can be presented in the view area 405 in a variety of ways, such as a map overlay or an overlay onto a still picture of the location. Further, as shown in this example, the mode of each multi-modal wireless controller 410 can be illustrated to provide visual and spatial understanding of the overall lighting system.

Information about a multi-modal wireless controller 410 selected in the view area 405 can be presented in the properties 420 area. Depending upon the background knowledge-base of the lighting system, the information displayed in the properties 420 area can vary. This example can show the basic information that would be stored in the multi-modal wireless controller 410—its mode or configuration ID and its control ID or group to which it belongs. In a lighting system having an additional database of information regarding placement information as well as information about the connected light or data sensor, the user interface 400 can be further configured to collect and present this additional information in the properties 420 area.

The properties 420 area can also include a means to modify one or more presented data items like a change button 425. Selection of the change button 425 can allow the user to make such a modification to the data in the properties 420 area, providing the configuration of the lighting system supports remote configuration of the multi-modal wireless controllers 410 and the user has the proper privileges to make such a change. Data changes can then be wirelessly conveyed to the appropriate multi-modal wireless controller 410.

Figure 5:
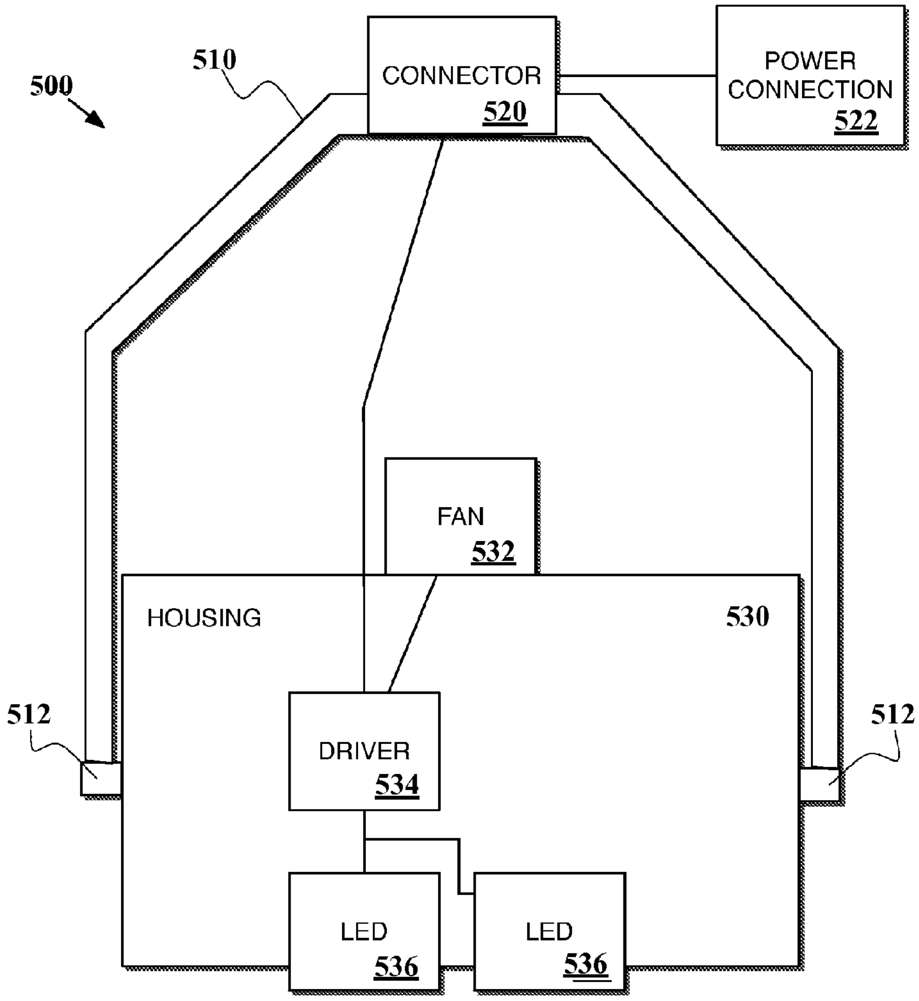
FIG. 5 depicts a high-level functional block diagram of bulb utilizing one or more LED clusters in accordance with an embodiment of the inventive arrangements disclosed herein.

The controller detailed herein can interoperate in accordance with numerous configurations and can control numerous lighting arrangements, one of which is shown in FIG. 5. FIG. 5 depicts a high-level functional block diagram of bulb 500 utilizing one or more LED clusters, the bulb 500 comprising housing 530 and bracket 510. Housing 530 comprises LED units 536, e.g., LED circuit, etc., a driver circuit 534 for controlling power provided to LED units 536, and fan 532. LED units 536 and fan 532 are operatively and electrically coupled to driver 534 which is, in turn, electrically coupled to connector 520 and power connection 522.

LED units 536 generate light responsive to receipt of current from driver 534. In one embodiment, each LED unit 536 can represent a LED cluster. In another embodiment, each LED unit 536 represents a single element or LED of a LED cluster.

In at least some contemplated embodiments, driver circuit 534 is not a part of housing 530 and is instead connected between power connection 522 and connector 520.

In at least some embodiments, LED units 536 and fan 532 are electrically coupled to a single connection to driver 534. For example, in at least some embodiments, the electrical connection between driver 534 and LED units 536 and fan 532 comprises a single plug connection. The single plug connection may be plugged and unplugged by a user without requiring the use of tools.

In at least some embodiments, housing 530 may comprise a greater number of LED units 536. In at least some embodiments, housing 530 may comprise a greater number of fans 532.

Fan 532 rotates responsive to receipt of current from driver 534. Rotation of fan 532 causes air to be drawn in through vents in front face and expelled via vents in rear face. The flow of air through bulb 500 by rotation of fan 532 removes heat from the vicinity of LED units 536 thereby reducing the temperature of the LED unit. Maintaining LED unit 536 below a predetermined temperature threshold maintains the functionality of LED unit 536. In at least some embodiments, LED unit 536 is negatively affected by operation at a temperature exceeding the predetermined temperature threshold. In at least some embodiments, the number of vents is dependent on the amount of air flow needed through the interior of LED bulb 500 to maintain the temperature below the predetermined threshold. In at least some embodiments, fan 532 may be replaced by one or more cooling devices arranged to keep the temperature below the predetermined temperature threshold. For example, in some embodiments, fan 532 may be replaced by a movable membrane or a diaphragm or other similar powered cooling device.

In at least some embodiments, fan 532 is integrally formed as a part housing 530. In at least some other embodiments, fan 532 is directly connected to housing 530. In still further embodiments, fan 532 is physically connected and positioned exclusively within housing 530.

In at least some embodiments, fan 532 may be operated at one or more rotational speeds. In at least some embodiments, fan 532 may be operated in a manner in order to draw air into bulb 500 via the vents on rear face and expel air through vents on front face. By using fan 532 in LED bulb 500, thermal insulating material and/or thermal transfer material need not be used to remove heat from the LED bulb interior.

In at least some embodiments, fan 532 operates to draw air away from housing 530 and toward a heat sink adjacent LED bulb 500. For example, given LED bulb 500 installed in a light fixture, fan 532 pulls air away from housing 530 and LED units 536 and pushes air toward the light fixture, specifically, air is moved from LED bulb 500 toward the light fixture.

In at least some embodiments, existing light fixtures for using high output bulbs, e.g., high-intensity discharge (HID), metal halide, and other bulbs, are designed such that the light fixture operates as a heatsink to remove the heat generated by the HID bulb from the portion of the fixture surrounding the bulb and the bulb itself. In a retrofit scenario in which LED bulb 500 replaces an existing light bulb, e.g. a HID bulb, in a light fixture designed for the existing light bulb, fan 532 of LED bulb 500 operates to move air from the LED bulb toward the existing heat sink of the light fixture. Because LED bulb 500 typically generates less heat than the existing bulb, the operation of fan 532 in connection with the LED bulb increases the life of the LED bulb within the light fixture. LED bulb 500 including fan 532 takes advantage of the design of the existing light fixture heatsink functionality.

Driver 534 comprises one or more electronic components to convert alternating current (AC) received from connector 110 connected to a power connection 522, e.g., a mains power supply or receiving socket, to direct current (DC). Driver 534 transmits the converted current to LED units 536 and fan 532 in order to control operation of the LED unit and fan. In at least some embodiments, driver 534 is configured to provide additional functionality to bulb 500. For example, in at least some embodiments, driver 534 enables dimming of the light produced by bulb 500, e.g., in response to receipt of a different current and/or voltage from power connector 522.

In at least some embodiments, driver 534 is integrated as a part of housing 530. In at least some embodiments, driver 534 is configured to receiver a range of input voltage levels for driving components of housing 530, i.e., LED units 536 and fan 532. In at least some embodiments, driver 534 is configured to receive a single input voltage level.

Bracket 510 also comprises connection point 512 for removably and rotatably attaching the bracket and housing. In at least some embodiments, connection point 512 is a screw. In at least some further embodiments, connection point 512 is a bolt, a reverse threading portion for receipt into housing 530, a portion of a twist-lock or bayonet mechanism.

In operation, if one or more LED units 536 in a particular housing 530 degrades or fails to perform, the entire LED bulb 500 need not be replaced. In such a situation, only housing 530 needs replacing. Similarly, if driver 534 fails or degrades in performance, only housing 530 needs to be replaced. If, in accordance with alternate embodiments, driver circuit 534 is connected external of bulb 500, driver circuit 524 may be replaced separate from bulb 500. Because of the use of releasably coupled components, i.e., bracket 510 and housing 530, the replacement of one or the other of the components may be performed on location with minimal or no tools required by a user. That is, the user may remove LED bulb 500 from a socket, replace housing 530 with a new housing, and replace the LED bulb into the socket in one operation. Removal of LED bulb 500 to another location or transport of the LED bulb to a geographically remote destination for service is not needed. Alternatively, the user may remove driver circuit 534 from between power connection 522 and connector 520, in applicable embodiments, and replace the driver. Also, if the user desires to replace a particular driver 534 of a bulb 500, the user need only remove and replace the currently connected driver 534. For example, a user may desire to replace a non-dimmable driver with a driver which supports dimming. Also, a user may desire to replace a driver having a shorter lifespan with a driver having a longer lifespan. Alternatively, a user may desire to replace a housing having a particular array of LED units 536 with a different selection of LED units 536, e.g., different colors, intensity, luminance, lifespan, etc.; the user need only detach housing 530 from bracket 510 and reattach the new housing 530 to the bracket.

Figure 6:
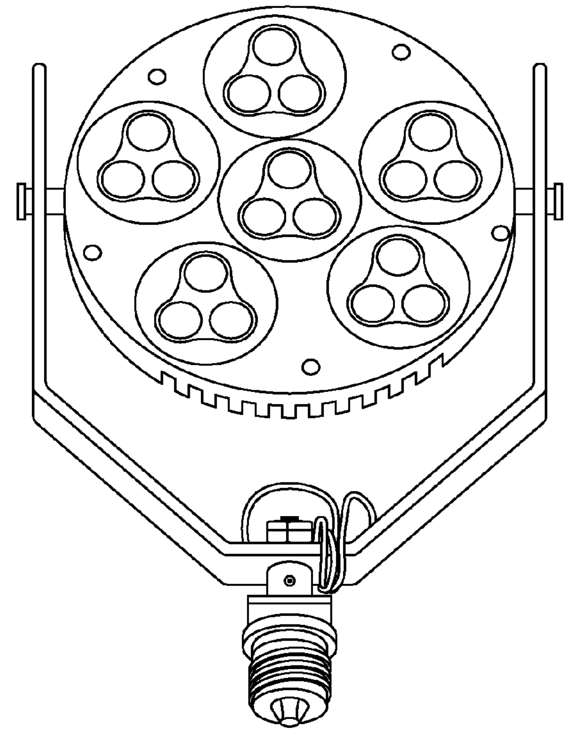
FIG. 6 is an illustration of a bulb in accordance with an embodiment of the inventive arrangements disclosed herein.

FIG. 6 is an illustration of an embodiment of bulb of one contemplated embodiment in a flat state. The bulb as illustrated comprises connection point affixed to housing. The illustrated connection point passes through openings in an arm of a bracket to enable the housing to be positioned along the length of the arm, in addition to enabling the rotation of the housing. FIG. 6 also depicts a bulb with a power connection attached to a connector.

Figure 7:
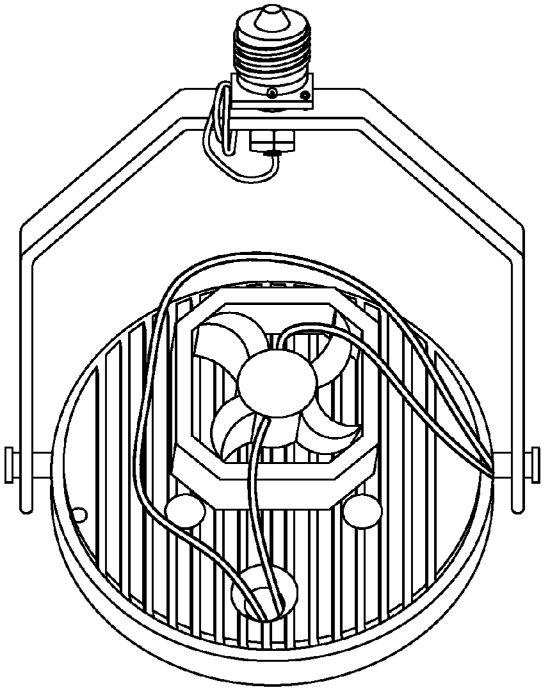
FIG. 7 is an illustration of a bulb having a housing in accordance with an embodiment of the inventive arrangements disclosed herein.

FIG. 7 is an illustration of one contemplated embodiment of a bulb having a housing at an angular displacement around the connection points, such that the housing is positioned at approximately a ninety degree angle with respect to the support arm.

Figure 8:
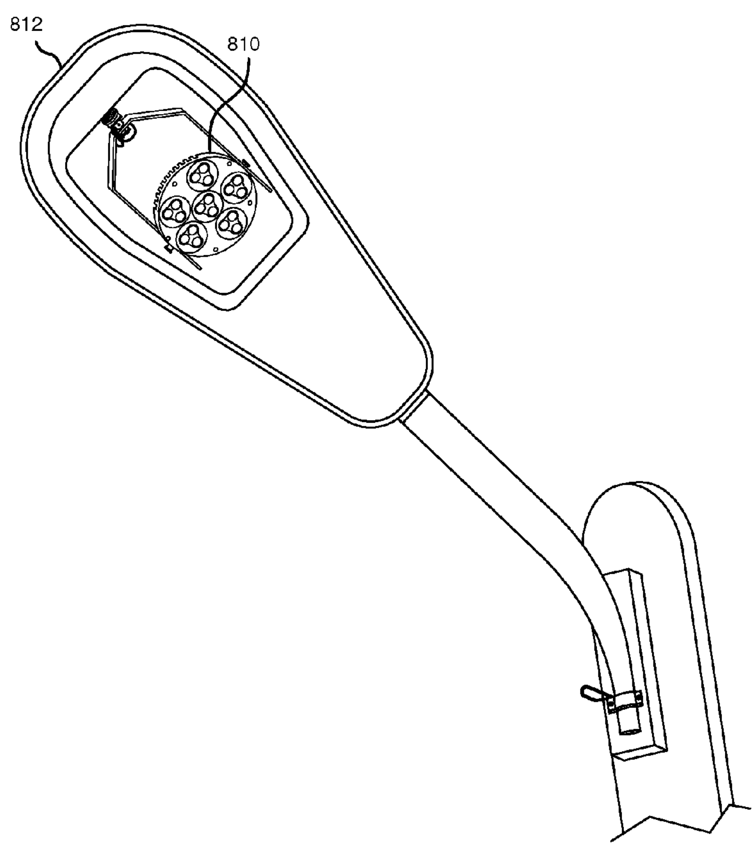
FIG. 8 depicts an image of an LED bulb installed in a light fixture in accordance with an embodiment of the inventive arrangements disclosed herein.

FIG. 8 depicts an image of an LED bulb 810 installed in a light fixture 812 in accordance with a contemplated embodiment of the disclosure.

It should be understood that embodiments detailed herein are for illustrative purposes only and that other configurations are contemplated. For specifically, the controller detailed herein may interoperate in accordance with numerous arrangements consistent with the disclosure provided herein is to be considered within the scope of the disclosure.

The flowchart and block diagrams in the Figures illustrate the architecture, functionality, and operation of possible implementations of systems and/or methods according to various embodiments of the present invention. It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A plurality of multi-modal wireless controllers for a lighting system, each comprising:

- a processor;
- a memory storage coupled to the processor and having a plurality of machine-readable instructions that define functionalities of a multi-modal wireless controller;
- a radio frequency (RF) engine coupled and responsive to the processor and configured to transmit and receive wireless RF signals;
- an output for outputting electrical power and a direct current (DC) voltage control signal;
- an power input configured to receive the electrical power from a power source;
- a power switch configured to switch on or off the electrical power between the power input and the output, responsive to the processor;
- a mode input coupled to the processor and including mode switch element having a plurality of settings that each correspond to one of a plurality of operating modes of the multi-modal wireless controller; and
- a RF input coupled to the RF engine and including RF switch element having a plurality of settings that each correspond to one of a plurality of operating frequencies of the RF engine and an identifier of a zone where the multi-modal wireless controller is located;
- wherein system includes a plurality of lighting fixtures, and a plurality of auxiliary data sensors configured to capture data that is meant to influence operation of the plurality of lighting fixtures, and wherein each lighting fixture includes one of the plurality of multi-mode wireless wherein each multi-modal wireless controller is coupled to one of an auxiliary data sensor or at most two lighting fixtures, wherein mode input switch element of each multi-modal wireless controller is set to correspond to a type of its coupled component, and wherein groups of multi-modal wireless controllers required to communicate with each other are configured to utilize a specified wireless channel designated by a unique control ID corresponding to a setting of each multi-modal wireless controller's RF switch element.

2. The plurality of multi-modal wireless controllers of claim 1, wherein the mode input of each multi-modal wireless controller is selectable to configure the multi-modal wireless controller to operate as a light source controller, wherein, upon being configured to operate as the light source controller, the at least one output is coupled to a light fixture, wherein the DC voltage control signal controls at least one operating parameter of the light fixture.

3. The plurality of multi-modal wireless controllers of claim 2, wherein the at least one operating parameter includes a light output parameter of the light fixture.

4. The plurality of multi-modal wireless controllers of claim 1, wherein for each multi-modal wireless controller the mode input is selectable to configure the multi-modal wireless controller to operate as a dimmer controller, wherein, upon being configured to operate as the dimmer controller, the at least one input is coupled to a dimmer sensor, wherein the multi-modal wireless controller transmits a dimmer control signal corresponding to a dimmer input signal received from the dimmer sensor, wherein the dimmer control signal is transmitted by the RF engine on the operating frequency indicated by the RF input to another multi-modal wireless controller that is configured as a light source controller for a connected light fixture.

5. The plurality of multi-modal wireless controllers of claim 1, wherein for each multi-modal wireless controller the mode input is selectable to configure the multi-modal wireless controller to operate as a photo sensor controller, wherein, upon being configured to operate as the photo sensor controller, the at least one input is coupled to a photo sensor, wherein the multi-modal wireless controller transmits a photo sensor control signal corresponding to a photo sensor input signal received from the photo sensor, wherein the photo sensor control signal is transmitted by the RF engine on the operating frequency indicated by the RF input to another multi-modal wireless controller that is configured as a light source controller for a connected light fixture.

6. The plurality of multi-modal wireless controllers of claim 1, wherein for each multi-modal wireless controller the mode input is selectable to configure the multi-modal wireless controller to operate as a motion sensor controller, wherein, upon being configured to operate as the motion sensor controller, the at least one input is coupled to a motion sensor, wherein the multi-modal wireless controller transmits a motion sensor control signal corresponding to a motion sensor input signal received from the motion sensor, wherein the motion sensor control signal is transmitted by the RF engine on the operating frequency indicated by the RF input to another multi-modal wireless controller that is configured as a light source controller for a connected light fixture.

7. The plurality of multi-modal wireless controllers of claim 1, wherein for each multi-modal wireless controller the operating mode comprises one of a light source controller, a dimmer controller, a photo sensor controller, and, a motion sensor controller.

8. The plurality of multi-modal wireless controllers of claim 1, wherein for each multi-modal wireless controller the RF engine transmits and receives RF signals using a standard wireless local area network protocol.

9. The plurality of multi-modal wireless controllers of claim 1, wherein each multi-modal wireless controller further comprises:

- a network jack for wire-based electronic communications; and
- a network interface controller coupled to the network jack and the processor to facilitate data exchanges utilizing the network jack.

10. The plurality of multi-modal wireless controllers of claim 1, wherein each multi-modal wireless controller further comprises:

- a second output coupled to a second light fixture and providing a second DC control signal that controls at least one operating parameter of the second light fixture.

11. A method of installing a lighting system comprising:

installing a plurality of lighting units, wherein each lighting unit includes a multi-modal wireless controller and at most two lighting fixtures whose operation is controlled by the multi-modal wireless controller;

configuring each of the plurality of multi-modal wireless controllers to operate as a light source controller from among several configuration options, wherein each configuration option is represented by a unique configuration ID;

configuring groups of the plurality of multi-modal wireless controllers to operate on one of a plurality of selectable wireless channels, wherein different groups operate on different wireless channels, wherein each selectable wireless channel is represented by a unique control ID; and each of the plurality of wireless multi-modal controllers receiving data from one of a plurality of auxiliary data sensors that are each configured to capture data that is meant to influence operation of the plurality of lighting fixtures;

wherein each multi-modal wireless controller includes a processor, a memory storage coupled to the processor and having a plurality of machine-readable instructions that define functionalities of the multi-modal wireless controller, a radio frequency (RF) engine coupled and responsive to the processor and configured to transmit and receive wireless RF signals, a power output for outputting electrical power and a direct current (DC) voltage control signal, a power input configured to receive the electrical power from a power source, a power switch configured to switch on or off the electrical power between one of the power input and the power output as controlled by the processor, a mode input coupled to the processor and including a mode input switch element whose positioning corresponds to an operating mode of the multi-modal wireless controller that defines the unique configuration ID of the multi-modal wireless controller and a RF input coupled to the RF engine and including a RF switch element whose positioning designates the control ID of the multi-modal wireless controller; and wherein configuring each of the plurality of multi-modal wireless controllers to operate as a light source controller from among several configuration options comprises setting the mode input switch element to a corresponding setting, and configuring groups of the plurality of multi-modal wireless controllers to operate on one of a plurality of selectable wireless channels comprises setting the RF switch element in each of the respective multi-modal wireless controllers to a setting corresponding to one of the groups, wherein each multi-modal wireless controller is able to be coupled with a different component by changing its unique configuration ID.

12. The method of claim 11, further comprising:

installing at least one auxiliary data sensor whose captured data is meant to influence operation of at least one of the plurality of lighting fixtures;

configuring a multi-modal wireless controller to operate as a controller for the at least one auxiliary data sensor from among the several configuration options; and configuring the multi-modal wireless controller with a same unique control ID as the multi-modal wireless controller for the at least one lighting fixture that the auxiliary data sensor is meant to control.

13. The method of claim 12, wherein an auxiliary data sensor comprises one of a dimmer sensor, a photo sensor, and a motion sensor.

14. The method of claim 12, further comprising:

decoupling the multi-modal wireless controller from the auxiliary data sensor;

reconfiguring the multi-modal wireless controller to operate as a wireless controller for one of a different type of auxiliary data sensor included within the several configuration options and a lighting unit, wherein the unique configuration ID of the multi-modal wireless controller is changed to a different configuration ID;

when necessary, reconfiguring the multi-modal wireless controller from a first unique control ID to a second unique control ID, wherein a group to which the multi-modal wireless controller belongs to is changed; and coupling the reconfigured multi-modal wireless controller to the one of the different type of auxiliary data sensor and the lighting unit.

15. The method of claim 11, further comprising:

reconfiguring at least one multi-modal wireless controller controlling one of the plurality of lighting units from a first unique control ID to a second unique control ID, wherein a group to which the multi-modal wireless controller belongs is changed without physically moving a lighting unit.

16. The method of claim 11, further comprising:

decoupling the multi-modal wireless controller of one lighting unit;

reconfiguring the multi-modal wireless controller to be a wireless controller for an auxiliary data sensor included in the several configuration options by reconfiguring the mode input switch of the multi-mode wireless controller;

when necessary, reconfiguring the multi-modal wireless controller from a first unique control ID to a second unique control ID, wherein a group to which the multi-modal wireless controller belongs to is changed; and coupling the reconfigured multi-modal wireless controller to the auxiliary data sensor, wherein the captured data of the different type of auxiliary data sensor now provides input to light source controllers having the same control ID.

17. A wirelessly-controlled lighting system comprising:

a plurality of lighting fixtures;

a plurality of auxiliary data sensors configured to capture data that is meant to influence operation of the plurality of lighting fixtures;

a plurality of multi-modal wireless controllers configured to control the operation of the plurality of lighting fixtures based upon the captured data of the plurality of auxiliary data sensors, wherein each multi-modal wireless controller is coupled to one of an auxiliary data sensor and at most two lighting fixtures, wherein a unique configuration ID of the multi-modal wireless controller is designated to match a type of its coupled component, wherein the multi-modal wireless controller is able to be coupled with a different component by changing its unique configuration ID, and, wherein groups of multi-modal wireless controllers required to communicate with each other are configured to utilize a specified wireless channel designated by a unique control ID;

wherein each multi-modal wireless controller includes a processor, a memory storage coupled to the processor and having a plurality of machine-readable instructions that define functionalities of the multi-modal wireless controller, a radio frequency (RF) engine coupled and responsive to the processor and configured to transmit and receive wireless RF signals, a power output for outputting electrical power and a direct current (DC) voltage control signal, a power input configured to receive the electrical power from a power source, a power switch configured to switch on or off the electrical power between one of the power input and the power output as controlled by the processor, a mode input coupled to the processor and including a mode input switch element whose positioning corresponds to an operating mode of the multi-modal wireless controller that defines the configuration ID of the multi-modal wireless controller and a RF input coupled to the RF engine and including a RF switch element whose positioning designates the control ID of the multi-modal wireless controller.

18. The wirelessly-controlled lighting system of claim 17, wherein an auxiliary data sensor comprises one of a dimmer sensor, a photo sensor, and a motion sensor.

19. The wirelessly-controlled lighting system of claim 17, wherein the plurality of lighting fixtures are components of an existing, static lighting system, wherein the plurality of multi-modal wireless controllers coupled to the plurality of lighting fixtures allow dynamic control of the plurality of lighting fixtures without requiring a need to map the plurality of lighting fixtures.

* * * * *